E. H. HILL,
Assignor to WASHBURN & MOEN MANUFACTURING CO.
Apparatus for Finishing Zinc Coated Wire.
No. 9,531. Reissued Jan. 11, 1881.
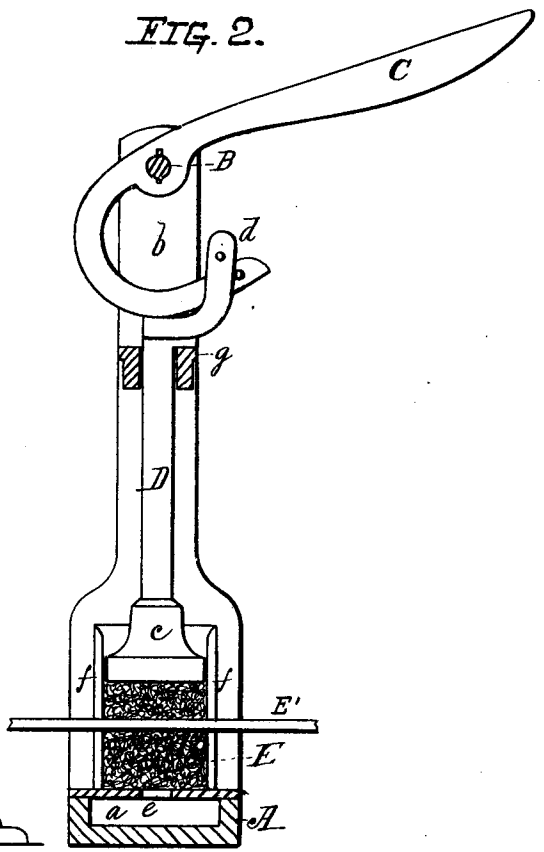
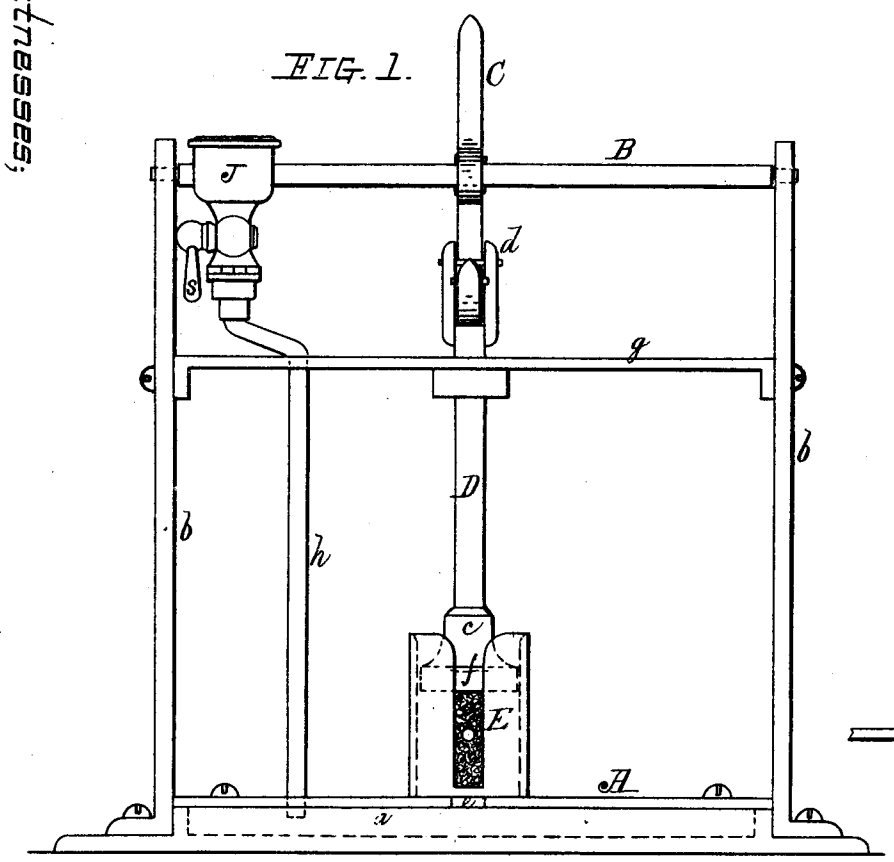
Witnesses;
Thos. H. Dodge
Edwin E. Moore
Inventor;
Edwin H. Hill
N. PETERS, PHOTO-LITHOGRAPHER, WASHINGTON, D. C.

UNITED STATES PATENT OFFICE.

EDWIN H. HILL, OF WORCESTER, MASSACHUSETTS, ASSIGNOR TO WASHBURN & MOEN MANUFACTURING COMPANY, OF SAME PLACE.

APPARATUS FOR FINISHING ZINC-COATED WIRE.

SPECIFICATION forming part of Reissued Letters Patent No. 9,531, dated January 11, 1881.

Original No. 204,571, dated June 4, 1878. Application for reissue filed November 15, 1880.

*To all whom it may concern:*

Be it known that I, EDWIN H. HILL, of the city and county of Worcester, and Commonwealth of Massachusetts, have invented certain new and useful Improvements in Apparatus and Mode for the Finishing of Zinc-Coated Wire; and I do hereby declare that the following is a full, clear, and exact description of the same, reference being had to the accompanying drawings, forming a part of this specification, and in which—

Figure 1 of the drawings is a representation of a side view of said machine used in carrying out my said invention, and Fig. 2 is a vertical transverse section thereof.

The invention has relation to improvements in machines and mode for finishing zinc-coated wire; and the nature of the invention consists in a cup, tube, or chamber slotted to allow the passage of the wire on emerging from the bath of melted zinc, and designed to contain asbestus or other non-inflammable fibrous substance compressed therein.

It also consists in the combination, with the said cup, tube, or chamber containing asbestus or other fibrous non-inflammable material, and slotted to receive the wire, of a plunger actuated by a suitable mechanism, and pressing the packing down upon the wire in a hard, compact manner.

It also consists in the combination, with the said tube, cup, or chamber, and a chamber communicating therewith and designed to contain oil, spirits of turpentine, or other lubricant, of a reservoir connected with the said chamber, and feeding the lubricant thereto, as will be hereinafter more fully set forth.

It also consists in the mode of finishing zinc-coated wire, as will be hereinafter described.

In the annexed drawings, the letter A designates a (preferably metallic) base containing a chamber, *a*, and carrying two spaced uprights, *b*, that afford bearings in their upper ends to a shaft, B, upon which is fulcrumed a cam-lever, C. The weight end of this lever is of hook form, and engages the slotted upper end, *d*, of a metallic plunger, D, having on its lower end a foot, *e*, fitting snugly in a metallic cup, E, upon the base. This cup communicates at its bottom with the chamber *a* by means of an orifice or orifices, *e*, and is slotted on directly-opposite sides, as shown at *f*, for the purpose of admitting the wire E′. This cup is partly filled with asbestus or other suitable fibrous and non-inflammable material. The end of the wire is then passed through the slots *f* aforesaid, and covered by a suitable quantity of the said material, which thus encompasses or surrounds the wire and forms a wiper, through which the wire passes, the cup E serving the purpose of retaining the wiping substance in position about the wire E′.

By depressing the power end of the cam-lever C the plunger-head enters the cup E and forcibly compresses and hardens the packing therein. As the wire is drawn through the cup after leaving the bath of melted zinc, all surplus zinc is wiped off therefrom by the said non-inflammable fibrous substance, and it leaves the said cup in a highly-polished, smooth, and finished condition, being also lubricated by the oil drawn up by the asbestus from the chamber *a* by capillary action.

Instead of the cam-lever above mentioned, I may use an ordinary screw to raise and depress the plunger, or any of the usual mechanical expedients commonly used for similar purposes. The plunger is guided during its movements by being passed through a brace, *g*, connecting the frame-uprights.

The chamber *a* is supplied with the lubricant used from an oil-cup, J, above it, and connected therewith by a pipe, *h*, the supply being regulated or cut off entirely by means of a stop-cock, *s*.

Those skilled in the art to which my invention belongs will understand the practical importance of the same, since to apply a zinc coating to wire necessitates the melting of the zinc, and consequently the metal wire, with its molten coating, as it leaves the molten bath, is raised to a high degree of heat, and, under the old modes of operation prior to my said invention, the zinc coating was not uniform and even, for the reason that no means had then been devised for rubbing down and off the surplus metal. Combustible fibrous material could not be employed, for the reason that it burns up and the residuum would adhere to the wire, the surface of which would be rendered by such operation more objectionable than if the wire were allowed to run through without any such attempt to remove the surplus metal. Then, again, running the wire through sand or charcoal left the zinc coating comparatively rough and uneven, even where the molten metal did not run down and adhere to the wire in small lumps or bunches. All these difficulties and objections are obviated by my invention. The asbestus or non-inflammable fibrous substance wraps closely and perfectly about the heated wire and its molten covering, thereby forcing the melted zinc into the cracks and evenly over the surface of the wire, and removing all surplus metal. The non-inflammable wiper also smooths and polishes the zinc coating in a very perfect manner.

What I claim as new, and desire to secure by Letters Patent, is—

1. In a machine for finishing zinc-coated wire, the chamber, tube, or cup E, having slots *f*, and designed to contain asbestus or other non-inflammable material properly compacted, substantially as specified.

2. In an apparatus for finishing zinc-coated wire, a wiper of asbestus or other non-inflammable fibrous substance, in combination with a suitable support which keeps the wiper in position to act upon the molten metal coating, substantially as and for the purposes set forth.

3. The combination, with the tube, chamber, or cup E, slotted to receive the wire and designed to contain asbestus, of a plunger fitting in said tube, chamber, or cup, and a mechanism for actuating the same, substantially as specified.

4. The combination, with a chamber, cup, or tube, a plunger, and its actuating mechanism, of a chamber designed to hold oil and communicating with the asbestus-receptacle, and an elevated oil-vessel feeding said chamber, substantially as specified.

5. The mode or process of finishing zinc-coated wire, substantially as above described, consisting of passing the wire, as it leaves the bath of molten metal, through a wiper of asbestus or other non-inflammable fibrous substance, whereby all the surplus metal is wiped off and the wire left smooth and in a highly-polished condition.

EDWIN H. HILL.

Witnesses:
THOS. H. DODGE,
EDWIN E. MOORE.